US006926578B1

(12) United States Patent
Casias et al.

(10) Patent No.: US 6,926,578 B1
(45) Date of Patent: Aug. 9, 2005

(54) DOUBLE INLET GAME CALL APPARATUS AND METHOD

(75) Inventors: Mark A. Casias, Rancho de Taos, NM (US); Wilbur R. Primos, Madison, MS (US)

(73) Assignee: Primos, Inc., Flora, MS (US)

( * ) Notice: Subject to any disclaimer, the term of this patent is extended or adjusted under 35 U.S.C. 154(b) by 27 days.

(21) Appl. No.: 10/122,866

(22) Filed: Apr. 15, 2002

(51) Int. Cl.[7] ............................. A63H 33/40; A63H 5/00
(52) U.S. Cl. ........................................ 446/202; 446/207
(58) Field of Search ............................... 446/202–209, 446/176, 180

(56) References Cited

U.S. PATENT DOCUMENTS

| | | | |
|---|---|---|---|
| 291,548 A | | 1/1884 | Swan |
| 2,544,370 A | | 3/1951 | Walther |
| 2,551,367 A | * | 5/1951 | Fahey ........................ 84/380 R |
| 3,054,216 A | * | 9/1962 | Testo ........................... 446/208 |
| 3,426,477 A | * | 2/1969 | Novaco ........................ 446/209 |
| 3,928,935 A | * | 12/1975 | Beadles, Jr. .................. 446/208 |
| 3,991,513 A | * | 11/1976 | Faulk ........................... 446/208 |
| 4,048,750 A | | 9/1977 | Wolfe |
| 4,054,134 A | | 10/1977 | Kritzer |
| 4,143,485 A | | 3/1979 | Stewart |
| 4,211,031 A | * | 7/1980 | Gambino ..................... 446/208 |
| 4,612,001 A | * | 9/1986 | Burnham ..................... 446/208 |
| 4,888,903 A | | 12/1989 | Knight et al. |
| 4,940,451 A | | 7/1990 | Leady |
| 4,950,198 A | | 8/1990 | Repko, Jr. |
| 5,222,903 A | | 6/1993 | Parrott et al. |
| 5,577,946 A | | 11/1996 | Oathout |
| 5,910,039 A | * | 6/1999 | Primos et al. .............. 446/207 |
| 6,062,940 A | | 5/2000 | Bean |
| 6,120,341 A | * | 9/2000 | Hafford ....................... 446/208 |

OTHER PUBLICATIONS

Advertisement for Mascot Duck Calls manufactured by Multi-Novelty Co., date unknown,
Advertisement for Combo Call manufactured by Superior Tool & Die Co., Inc., 1959.
Photographs of Primos Hyper Lip Single, date unknown.

* cited by examiner

*Primary Examiner*—Derris H. Banks
*Assistant Examiner*—Faye Francis
(74) *Attorney, Agent, or Firm*—Holland & Hart (57) ABSTRACT

A double inlet game call apparatus includes at least two reed assemblies having two reeds, two sounding boards, and two air passageways. The reed assemblies may be physically separate and/or separate in terms of function, and are capable of simultaneously or alternatively producing sounds that simulate the sounds of wild animals. In particular, the multiple reed assemblies will allow the user of the game call to simulate a herd of animals. In one embodiment, the reed assembly section may be utilized without a sound chamber. In another embodiment, the reed assembly section is coupled to a single sound chamber. In yet another embodiment, the reed assembly section is coupled to a double sound chamber.

44 Claims, 6 Drawing Sheets

DOUBLE INLET GAME CALL APPARATUS AND METHOD

FIELD OF THE INVENTION

This invention relates to game calls, and, more particularly, to mouth-blown game calls for producing sounds that simulate the sounds of wild animals.

BACKGROUND OF THE INVENTION

Game calls have existed in many different forms for many years. Game calls are generally used to lure or attract game animals by simulating sounds of those particular game animals.

With respect to hunting big game animals, a common tactic for luring animals is to make sounds of a female animal. North American elk, for example, are drawn toward sounds of a cow elk. Cow elk are attracted to and will move in the direction of cow elk sounds. The same is true for bull elk, particularly during the rut (the mating season for elk). By making cow elk sounds, both cows and bulls tend to relax and believe that a herd is nearby.

One particular problem that has surfaced in recent times is the overuse of game calls by hunters in the field, particularly in areas receiving heavy hunting pressure. For this reason, new types of game calls capable of making new, authentic sounds are constantly being developed to change the traditional game calling methods to lure game animals.

"Fighting cow elk sounds" are certain types of cow elk sounds believed to be particularly luring to a bull elk. These sounds may result when two cow elk begin to fight at the time one of the cow elk is ready to be bred. When cow elk fight in these particular circumstances, the two fighting cows rear up on their hind hooves and try to kick each other with their front legs while they make the fighting cow sounds. These sounds may also result simply when one cow elk in estrus is ready to be bred makes a sound and another cow elk makes a similar sound to compete for the bull's attention. Apparently bull elk that hear fighting cow elk sounds come in quickly thinking that one of the cows will be receptive to breeding. Fighting cow elk sounds overlap each other in time because the cows make such sounds at the same time they are competing for attention or are fighting. Such sounds are also distinct, relative to other types of elk sounds, because they carry a tone of urgency, are made in rapid succession, and extend over a relatively high range of tones (tones that change from higher tones to lower tones).

Recently, various game call companies have developed a new type of game call—the so-called hyper call—to simulate sounds described above when two cows are fighting and one is ready to be bred. These new types of "hyper" calls are generally mouth-blown calls having a reed that vibrates when air is forced over its free end. When the reed is producing sound, the user moves his or her upper or lower lip along the length of the reed to change the effective length of the reed and thereby change the tones produced by the game call. These hyper calls typically produce a series of notes which go from high notes (where the effective length of the reed is relatively short) to low notes (where the effective length of the reed is relatively long).

Similar to other types of game calling, however, game animals have quickly become accustomed to the "hyper" sounds made by hunters in the field. Accordingly, the "hyper" calls are now considered less effective than when they were first used by hunters a few years ago. Thus, there is a need to develop yet a new sounding game call which is authentic sounding and is a new type of call that hunters can use in the field to lure game animals.

Another challenge faced by game call users relates to the need to create multiple sounds, or at least sounds in rapid succession, coming from different locations to simulate an entire herd of game animals. Animals, particularly elk, feel more secure in a group. Elk understand that there is safety in numbers. Hunters sometimes carry multiple calls into the field and blow through each call in sequence to sound like multiple animals in a herd. Hunters also attempt to "throw" calls (by cupping their hands or using a tube) in different directions to sound like a herd of animals. While this type of calling can be effective, there remains a need to develop a game call that more efficiently and more accurately simulates the sound of multiple animals at the same time.

Over the years, game calls that involve separate, side-by-side calls or end-on-end calls have been developed. Such game calls are designed so that only one of the game calls is to be positioned inside the user's mouth at a time. Furthermore, game call fasteners and other similar mechanisms have been developed which allow multiple game calls to be coupled together and held by a lanyard around a person's neck. A primary purpose of these types of fastening devices is to prevent the various game calls from clanking together and making noise while in the field. Here also, the intent is that the user of the game calls will use only one game call at a time. Such fasteners allow game calls to be maintained close together in the field so that the user can switch to other calls quickly and handily, as appropriate.

SUMMARY OF THE INVENTION

The present invention relates to a double inlet game call apparatus which includes at least two separate reed assemblies (i.e., at least two sounding boards, two reeds, two reed retaining systems, and two air channels or passageways). The reed assemblies may be physically separate from one another and/or separate in terms of function. The two reed assemblies may be integrally formed adjacent one another or may comprise separate components which are coupled together. In one embodiment, the two reed assemblies are oriented in side-by-side relationship. The multiple reed assemblies are intended to be inserted into the user's mouth at the same time so that the user can produce sounds with the game call by utilizing either one of the reed assemblies at a time or utilizing both reed assemblies simultaneously. By employing multiple reed assemblies at the same time, the game call user is able to simulate a herd of animals. The two reed assemblies may be employed alternately (i.e., one after the other, but not overlapping) while they are both positioned inside the caller's mouth. This is accomplished by maneuvering the call inside the user's mouth so that reed assemblies are separately and alternately employed. When alternate sounds are produced through the separate reed assemblies, such sounds can be produced in rapid succession or in a more drawn out manner. Alternatively, the two reed assemblies can be employed simultaneously (i.e., at the same time) to produce sounds that simulate a herd of animals. The tone produced by the respective reed assemblies can be varied by changing the effective length of one or both reeds, by changing the thicknesses of the reeds, by changing the pressure point on the reed, by changing air pressure across the reed, and by many other variables.

A sound chamber may be utilized in connection with the double inlet game call apparatus according to the present invention. The sound chamber functions to convert or enhance sounds made by the double reed assemblies. Where no sound chamber is utilized in connection with the double reed assemblies, the sounds and tones produced by the game call are very loud and strong. In contrast, when the sound chamber is used in connection with the reed assembly section, a much softer or lowered tone or sound is produced by the game call apparatus.

The double inlet game call apparatus according to the present invention will allow the user to create sounds that simulate a herd of animals more effectively as compared to prior art game calls. Further, the multiple sounds created by the present double inlet game call apparatus will attract animals, particularly elk, more efficiently because both reed assemblies remain in the game caller's mouth. The present game call also more realistically simulates the fighting cow calls made during the elk rut.

The foregoing and other features, utilities, and advantages of the invention will become apparent from the following detailed description of the invention with reference to the accompanying drawings.

DETAILED DESCRIPTION OF THE PREFERRED EMBODIMENT

The present invention relates to a double inlet game call apparatus 10 which includes generally a double inlet reed assembly section 12 and a sound chamber section 15 coupled to the double inlet reed assembly section 12.

With reference to FIGS. 2–6, the double inlet reed assembly section 12 comprises a pair of bases or first and second sounding boards 14, 16, respectively. The first sounding board 14 comprises a first main air channel or passageway 18 which extends from a proximal end 20 (FIG. 3) of the doublet inlet assembly to a distal end 22 of the double inlet assembly 12. The first sounding board 14 further comprises a pair of guide posts 24 and an expanded open end area 26 which opens increasingly as it extends toward the distal end 22 of the double inlet assembly.

Figure 3:
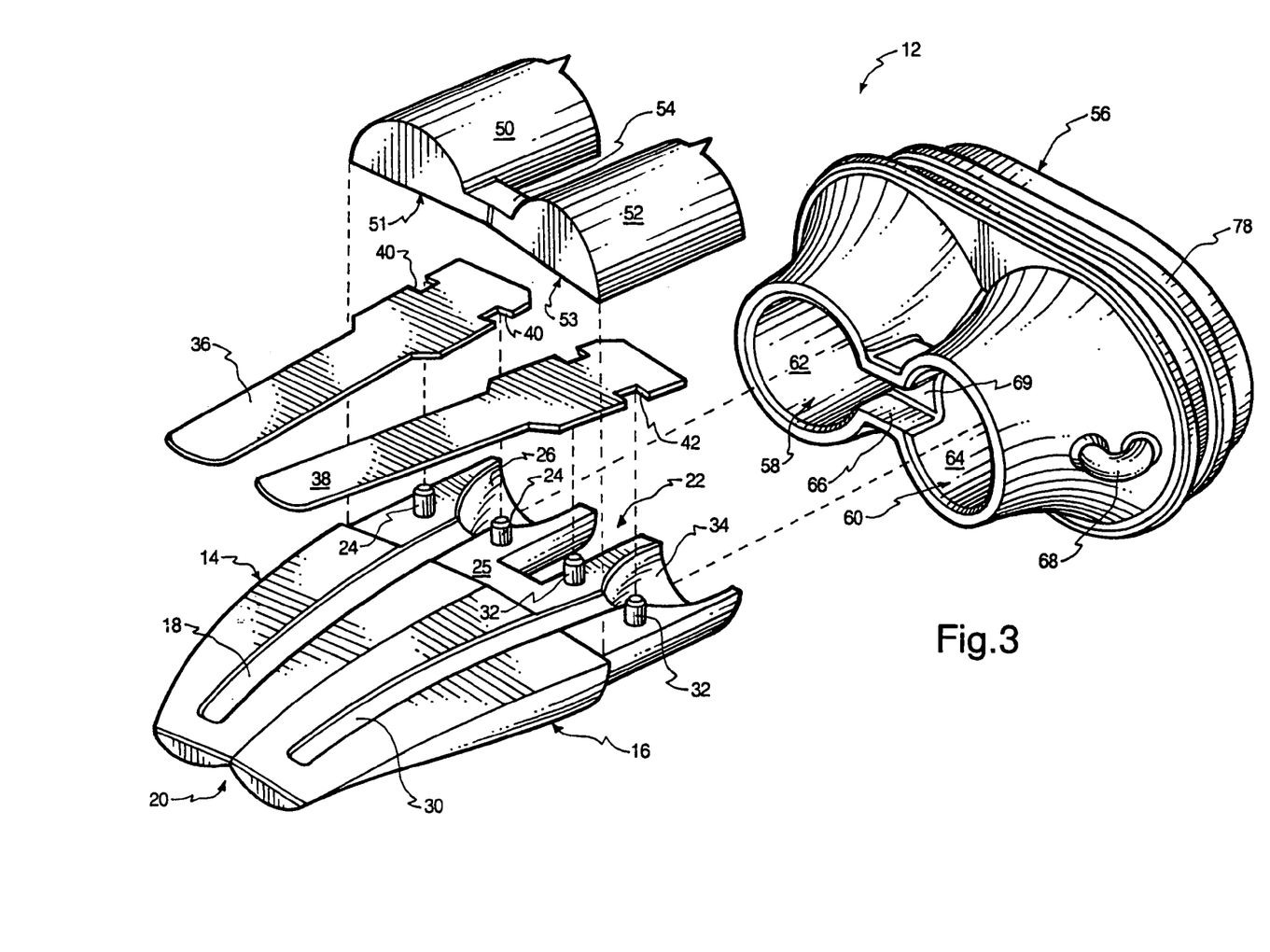
FIG. 3 is an exploded perspective view of the double inlet reed assemblies as shown in FIG. 2.
Figure 4:
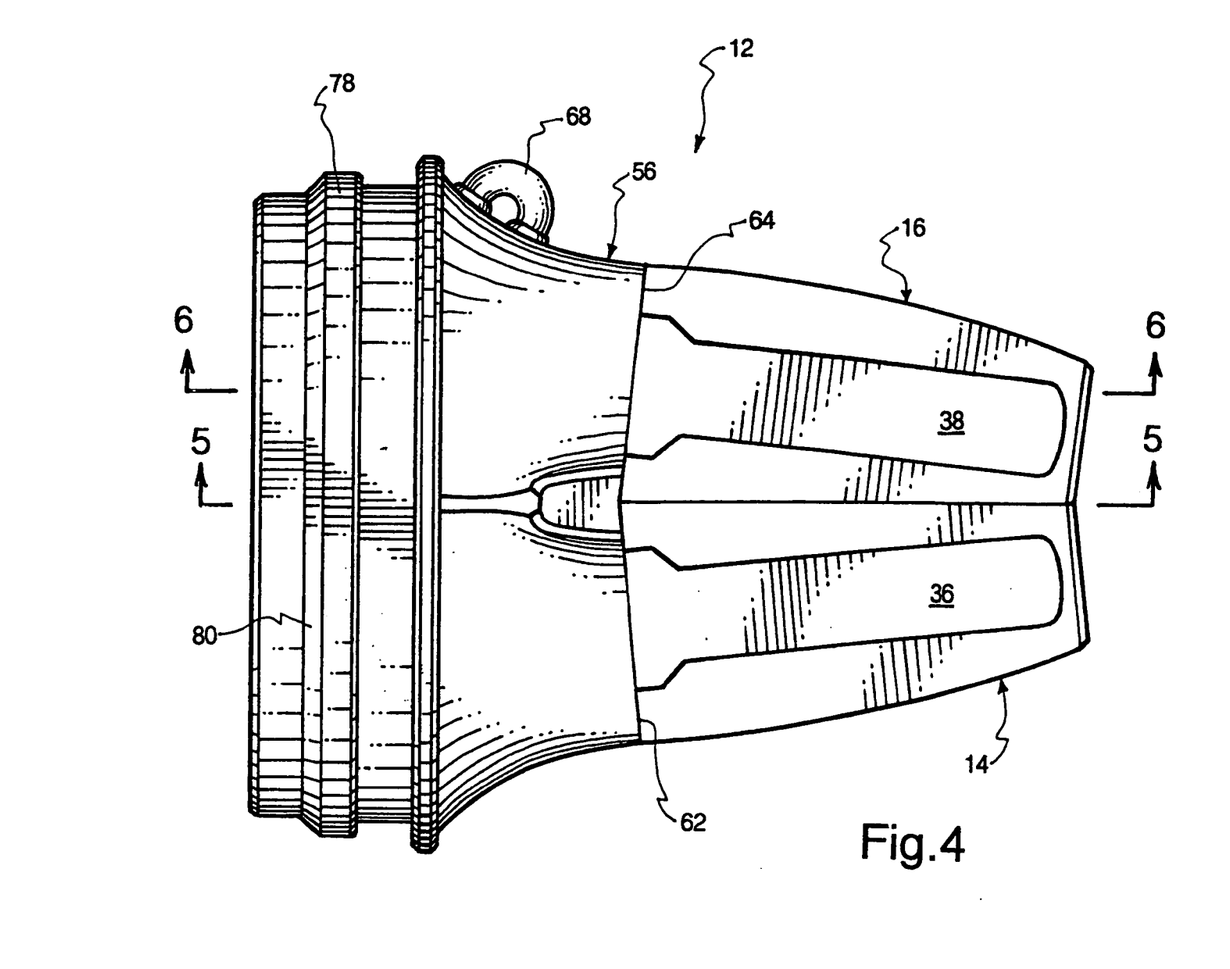
FIG. 4 is a top view of the double inlet reed assemblies as shown in FIG. 2.
Figure 5:
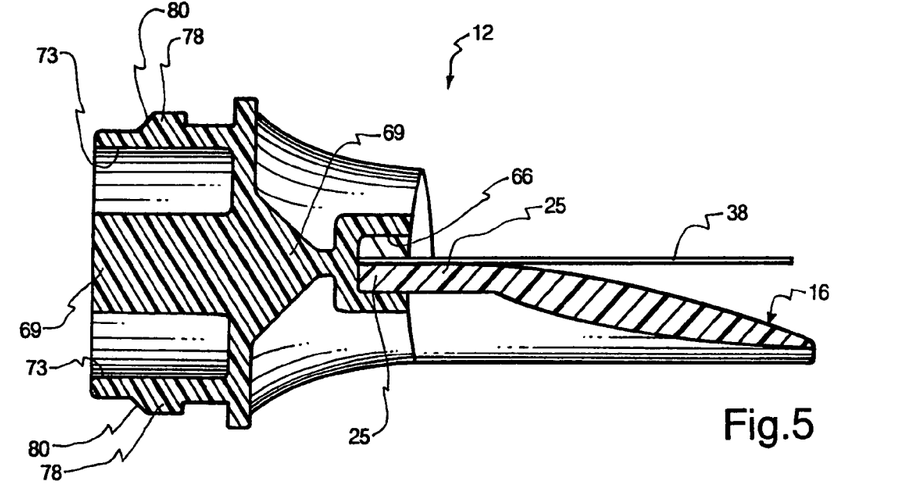
FIG. 5 is a sectional side elevation view, taking along the line 5—5 of FIG. 4, of the double inlet reed assemblies shown in FIG. 2.
Figure 6:
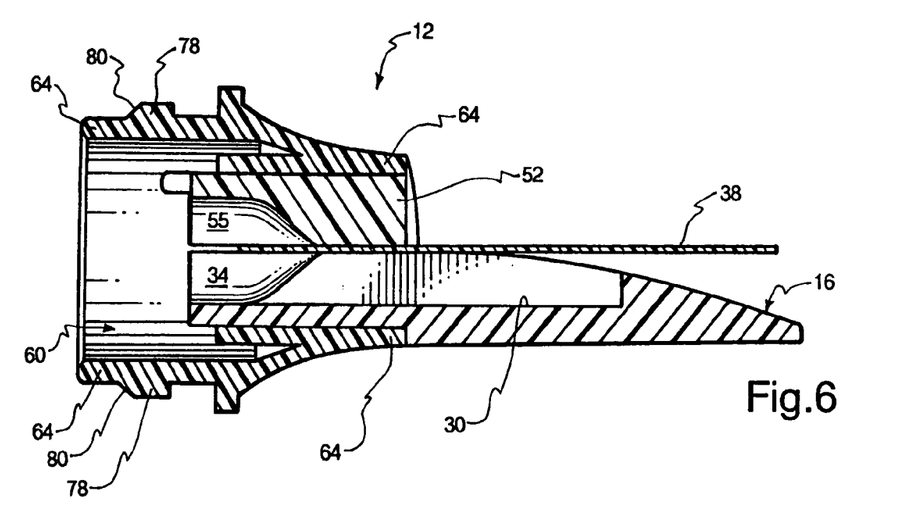
FIG. 6 is a sectional side elevational view of a game call apparatus taking along line 6—6 of FIG. 4, of the double inlet reed assemblies shown in FIG. 2.

The second sounding board 16 includes a second main air channel or passageway 30, a pair of guide posts 32, and an expanded open end area 34 which progressively expands toward the distal end 22 of the double inlet assembly 12.

A first reed 36 is coupled to the first sounding board 14 and a second reed 38 is coupled to the second sounding board 16. Reed 36 includes a pair of cut-out areas or notched openings 40 which pass over guide posts 24 and allow for longitudinal adjustment relative to the main air passageway 18. Similarly, reed 38 includes a pair of cut-out areas or notched openings 42 which are inserted over guide posts 32 and allow the reed 38 to be adjusted longitudinally relative to main air passageway 30. Likewise, the sets of guide the reed assembly 12 has been taken apart for servicing, cleaning, or otherwise.

It is to be understood that the reeds 36, 38 may be made of varying thicknesses to change the tones produced by the reeds. In addition, reeds 36, 38 may be made of different lengths to also change the tones produced by the reeds. Still further, the effective lengths of reeds 36, 38 may be changed by a clamp or other device (e.g., a rubber band) extending around one or both reeds 36, 38 and their respective sounding boards 14, 16 to change the tones generated by the respective reed assemblies.

It should be noted, with respect to the embodiment shown in FIGS. 1–6, that the effective length of one or both reeds 36, 38 is initially determined by the contact points or edges 51, 53 of wedge pieces 50, 52 (at least when the call is not being used). When the call is being used, the user's lip (either the upper lip of the user or the lower lip of the user, depending upon how the call is oriented) defines the effective length of one or both reeds 36, 38. During use, the user's lip moves longitudinally relative to the reed(s) 36, 38 while maintaining pressure on the reed(s) to change the cantilevered distance or effective length of the reed(s). This, as is understood by those in the art, is how the game call produces varying tones.

The reed assemblies (i.e., the sounding boards, the air passageways, and the reeds) are oriented immediately adjacent one another to be positioned simultaneously inside the mouth of the user. The words "immediately adjacent" mean that the reed assemblies are close enough in proximity to be able to fit inside a user's mouth at the same time where the user can employ the separate reed assemblies simultaneously or alternatively. Further, the reed assemblies may be physically separate and/or separate in terms of function. In one embodiment, the air passageways are completely separate from one another along areas corresponding to their respective reeds, as shown in FIG. 3. Accordingly, the reed assemblies are capable of simultaneously or alternatively producing sounds that simulate the sounds of multiple wild animals. In particular, the multiple reed assemblies will allow the user of the game call to simulate a herd of animals.

More specifically, to create sounds similar to the "hyper" sounds made by cow elk during the mating season, at the outset the user places his or her lip on the reed to shorten the effective length of one or both reeds. After the first sounds have been generated by the reed(s) with the short effective length, the reed(s) is inserted further into the user's mouth, while maintaining lip pressure on reed, which changes the effective length of the reed(s) and produce increasingly lower tones. This movement may be reciprocated for repeated "hyper" sounds. This type of combined reed configuration and reed movement produces high-to-low sounds which are highly similar to the high-to-low sounds made by elk. Perhaps, more importantly, the side-by-side orientation of the game call assemblies, in combination with the high-to-low sound-producing ability, allows such sounds to be made simultaneously to replicate fighting cow call sounds or sounds of multiple estrus sounds of cow elk.

Figure 1:
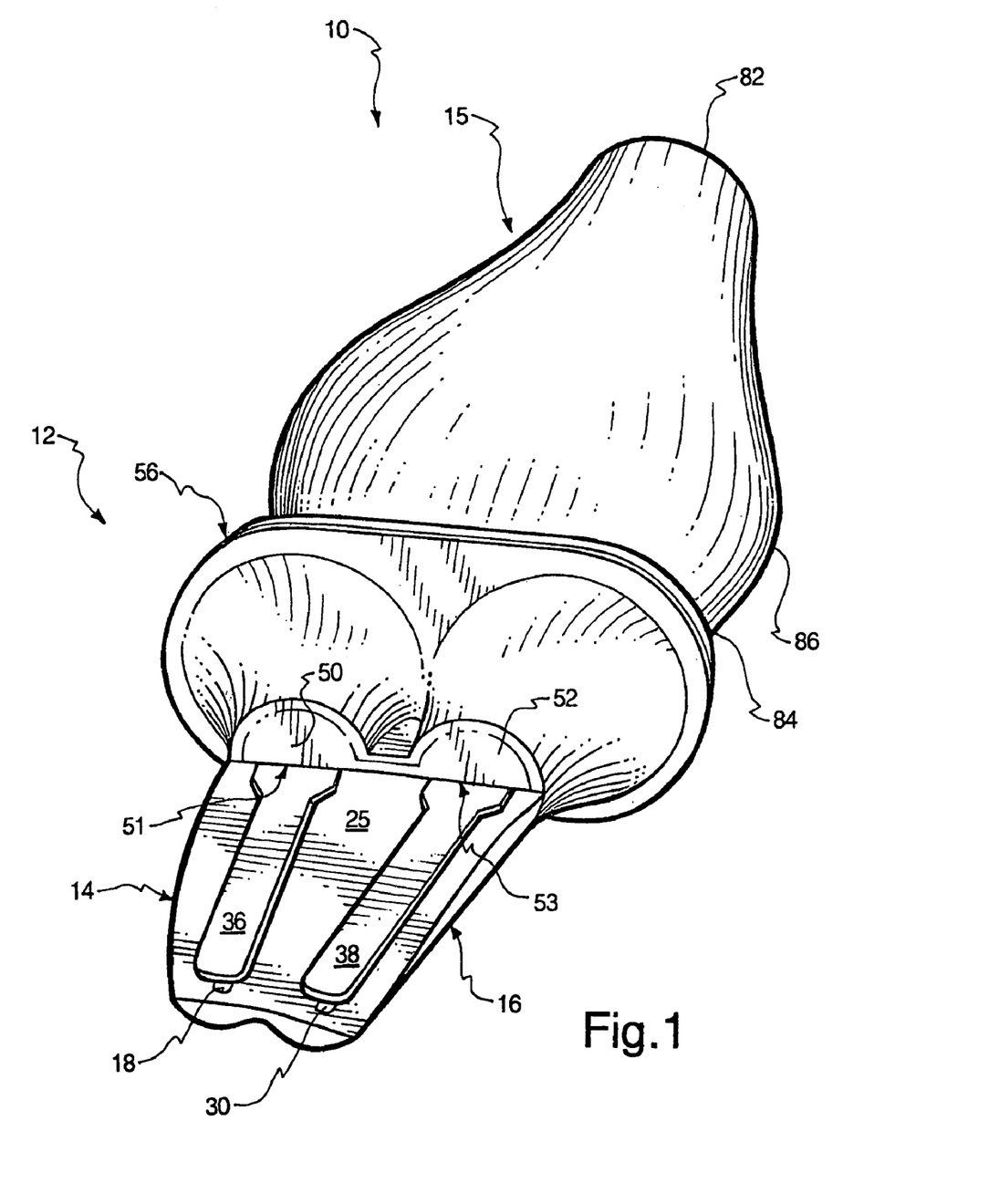
FIG. 1 is a perspective view of a double inlet game call apparatus according to the present invention.
Figure 2:
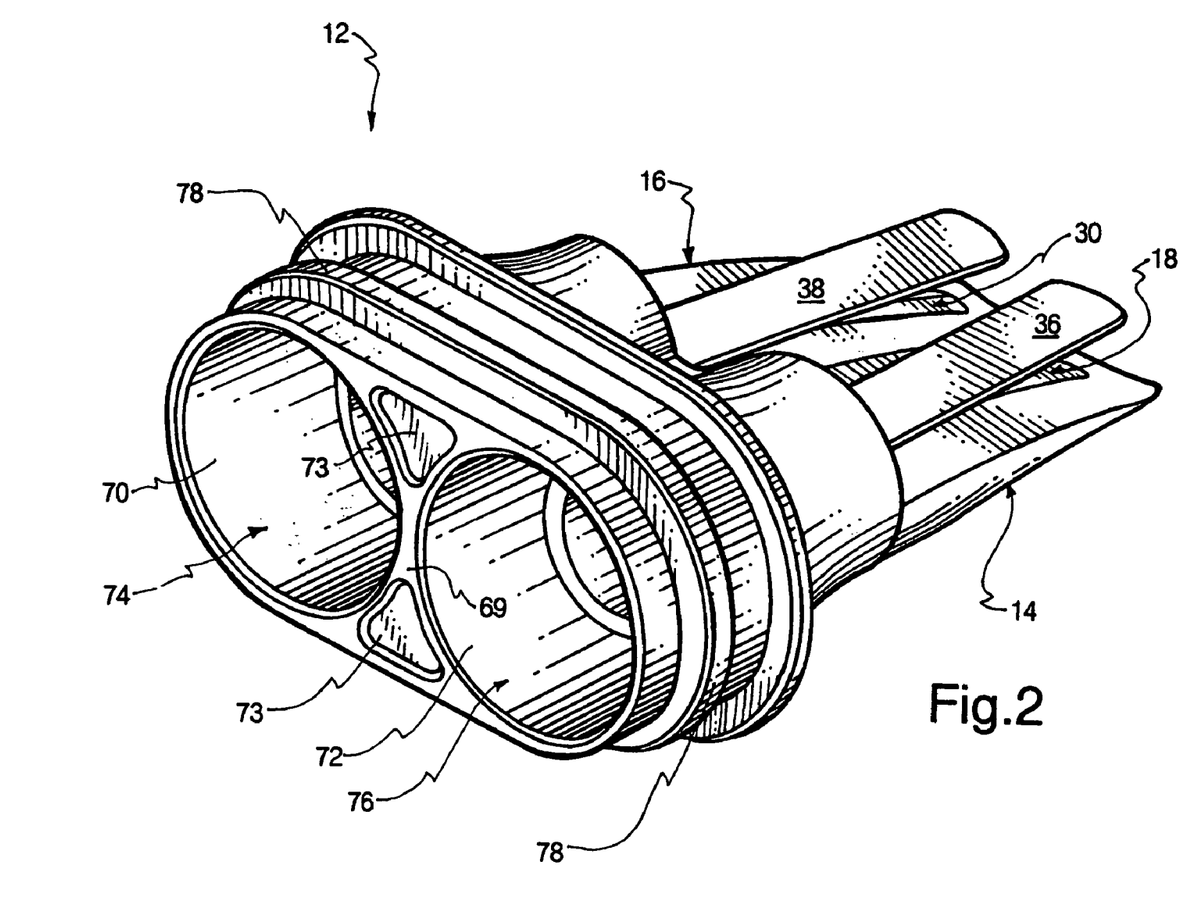
FIG. 2 is a perspective view, reversed 180 degrees relative to what is shown in FIG. 1, of the double inlet reed assemblies of the game call apparatus without the sound chamber.

To retain the reeds 36, 38 on the sounding boards 14, 16, a wedge piece or first retaining member 50 is secured on top of the reed 36 and positioned over guide posts 24 to secure first reed 36 in the desired orientation relative to the sounding board 14. The retaining member 50 includes cavities or pockets (not shown) that correspond in size to the guide posts 24 so that the retaining member fits securely in place on top of reed 36. A second wedge piece or retaining member 52 is secured on top of reed 38 and positioned over guide posts 32 to secure the second reed 38 in the desired position relative to the sounding board 16. The retaining member 52 includes cavities or pockets (not shown) that correspond in size to the guide posts 32 so that the retaining member fits securely in place on top of reed 38. A tab or joining member 54 holds the first retaining member 50 and the second retaining member 52 together relative to one another. As mentioned above, the first and second retainers 50, 52 place downward pressure on reeds 36, 38 at reed contact locations 51, 53 (FIGS. 1 and 3). Each retainer 50, 52 includes a cavity (only one shown—cavity 55 in FIG. 6) which open toward the distal end of the reed assembly.

With reference to FIG. 3, the entire double inlet reed assembly is held together by a sleeve or housing 56, which is inserted over the dual sounding boards 14, 16, the dual reeds 36, 38, and the dual retainers 50, 52. The housing 56 includes a first aperture 58 and a second aperture 60. The first aperture 58 is sized to slide over and retain the combined sounding board 14, reed 36, and retaining piece 50 in place relative to one another. The second aperture 60 is similarly sized to slide over and retain the sounding board 16, reed 38, and retaining piece 52 in place relative to one another.

The housing 56 more specifically comprises a first cylindrical wall 62 which defines aperture 58 and a second cylindrical wall 64 which defines aperture 60. The cylindrical walls 62, 68 are generally circular in cross section and sized to provide a slight interference fit with the combined sounding board, reed, and wedge piece assemblies. A barrier, divider or wall 69 is provided between apertures 58 and 60 to maintain separate the passageways leading from the sounding boards 14, 16 (FIG. 3) toward the sound chamber (FIG. 1).

A channel 66 (FIG. 3) extends between the first aperture 58 and second aperture 60. Channel 66 is intended to be inserted over the middle wall or divider area 25 which joins the first sounding board 14 and the second sounding board 16. As shown in FIG. 3, a lanyard ring 68 may be coupled to the housing 56 to provide a secure location for securing a lanyard (not shown) to the game call for hanging the call around a person's neck.

Toward the outlet end of housing 56 (shown in FIG. 2), a pair of diverging, conically shaped walls 70, 72 define expanding open areas 74, 76 which extend from apertures 58, 60 (FIG. 3). Apertures 74, 76 extend, in turn, toward the sound chamber 15 (FIG. 1). The expansion openings 74, 76 direct sounds produced by the reed assemblies toward the sound chamber 15 (FIG. 1). Dead air spaces or pockets 73 are formed in the exit or distal end of the reed assembly. Pockets 73 are simply intended to reduce the material in the reed assembly and thus make the game call lighter and less expensive to manufacture.

A raised retaining rib 78 is formed on the outside of housing 56 (FIGS. 2–4) toward the outlet end or distal end of the dual reed assembly section 12. The raised retaining rib 78 is formed on the outlet end of the housing 56 to retain a similarly sized large inlet end opening 84 (the actual opening is not shown) of sound chamber 15 (FIG. 1). A ramped surface 80 (FIG. 4) extends from the raised rib 78 downwardly toward the distal or outlet end of the housing 56 to allow the large end opening 84 of the sound chamber 15 to be inserted more readily over raised rib 78. Once the sound chamber 15 is inserted over raised rib and secured to the distal or outlet end of the housing section 56, the rib serves to retain the sound chamber in place on the housing.

With reference to FIG. 1, the sound chamber 15 includes a distal or outlet end opening 82, which is smaller in cross-sectional area than the large inlet end opening 84 which is coupled to the outlet end of housing 56. Overall, the wall thickness of sound chamber is relatively constant to form a sound chamber similar in shape to the outside appearance of the sound chamber 15. An expanded middle section 86 is formed between the small outlet end opening 82 and the larger inlet end opening 84. The expanded middle section 86 allows for an increased amount of air to pass into the sound chamber when the call is being used. Downstream, the small, restricted outlet end opening 82, which is smaller in cross section than the large inlet end opening 84 of the sound chamber 15, creates a type of back pressure or air build-up within the sound chamber 15 which enhances the resonance and tonal qualities of sounds produced by the game call.

The sound chamber 15 is intended to be used where the sounds or tones produced by the game call need to be softened or lowered. If relatively louder sounds are desired, the sound chamber may be removed from the reed assembly section 12 so that the sounds are not softened or lowered when the game call is being used. This would perhaps be desirable when attempting to call from long distances. When attempting to call from relatively shorter distances and to maintain realism or authenticity, the sound chamber softens or lowers the tones and volume to be generated when using the call.

Figure 7:
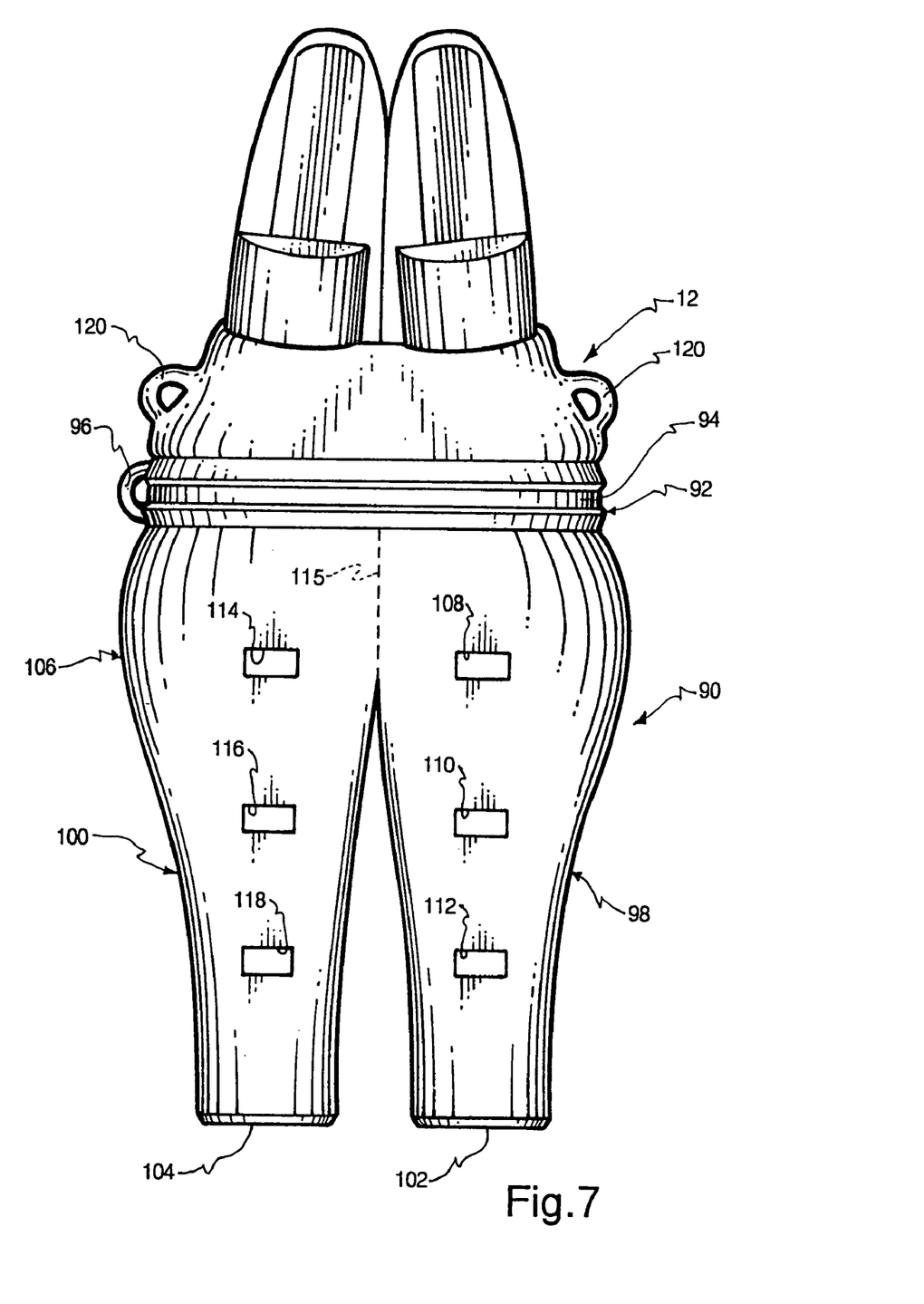
FIG. 7 is a top view of an alternative embodiment of a dual inlet game call apparatus according to the present invention.

FIG. 7 shows an alternative embodiment of a sound chamber 90. Sound chamber 90 includes an attachment end 92 coupled to the reed assembly section 12. End 92 is substantially similar in size as the large inlet end opening 84 of the first embodiment of the sound chamber 15, and receives the outlet end of the dual reed assembly section 12 (FIGS. 1–6). The attachment end 92 of sound chamber 90 further includes, as shown in FIG. 7, a groove 94 and an associated loop 96 for accommodating a lanyard (not shown). Dual sound chambers 98, 100 are formed on the outlet end of the sound chamber 90. Sound chamber 98 includes an expansion area and a restricted outlet end opening 102 to create back pressures similar to what is discussed above with respect to sound chamber 15 shown in FIG. 1. For its part, sound chamber 100 includes an expansion area and a restricted outlet end opening 104 includes its separate outlet end 104 to create back pressures similar to what is discussed above with respect to sound chamber 15 shown in FIG. 1. The attachment end 92 defines an opening which is bigger than the collective cross-sectional areas of outlet end openings 102, 104. A partition (see dashed line 115 in FIG. 7) may be provided to divide and maintain separate the two sound chambers 98, 100. Alternatively, the partition 115 may be omitted to allow the air and sounds passing through the sound chambers 98, 100 to mix prior to leaving the game call through apertures 102, 104. A plurality of apertures 108–118 may also be provided at the top walls of the respective sound chambers 98, 100. These apertures 108–118 may be covered or left open to adjust the tones produced by the game call.

Finally, with respect to the embodiment of FIG. 7, a pair of additional loops or rings 120 may be provided on the dual reed assembly section 12 to allow a lanyard to be placed around the game call. Use of lanyard loops 120 may be desirable where the sound chamber is removed and the game call is used with no sound chamber.

In operation, a game call according to the present invention is inserted into a user's mouth so that the first and second sounding boards, air passageways, and reeds are placed simultaneously inside the mouth of the user of the game call apparatus. The user then passes air across the first reed to produce sounds, and may also pass air across the second reed to produce sounds. Therefore, the user may produce sounds by passing air across both the first and second reeds simultaneously so that sounds from the first reed and sounds from the second reed overlap in time. In addition, the game call user may produce sounds by passing air across the first reed and then, alternatively, by passing air across the second reed so the sounds produced by the respective reeds are separate in time. The user may rock the game call from side to side while using the call to create such overlapping and/or separate sounds. This side-to-side motion of the game call may be combined with moving the mouthpiece assembly in and out of the user's mouth to change the effective length of the reeds. The resulting sounds simulate the sounds of multiple game animals.

While this invention has been described with reference to certain specific embodiments and examples, those skilled in the art will recognize that many variations are possible without departing from the scope and spirit of this invention. The invention, as described by the claims, is intended to cover all changes and modifications of the invention which do not depart from the spirit of the invention. The words "including" and "having," as used in the specification, including the claims, shall have the same meaning as the word "comprising."

What is claimed is:

1. A game call apparatus, comprising:
   a first sounding board;
   a second sounding board;
   a first air passageway formed in the first sounding board;
   a second air passageway formed in the second sounding board;
   a first reed coupled adjacent the first air passageway, the first reed vibrating to produce sounds as air passes over the first reed;
   a second reed coupled adjacent the second air passageway, the second reed vibrating to produce sounds as air passes over the second reed;
   the first and second sounding boards, air passageways, and reeds being oriented immediately adjacent one another to be positioned simultaneously inside the mouth of the user of the game call apparatus wherein the first and second air passageways are completely separate from one another along areas corresponding to the respective reeds, and further comprising a mixing chamber immediately downstream of the first and second air passageways, the mixing chamber receiving air as it passes from the first and second air chambers to mix the sounds before exiting the call.

2. A game call apparatus, comprising:
   a first sounding board;
   a second sounding board;
   a first air passageway formed in the first sounding board;
   a second air passageway formed in the second sounding board;
   a first reed coupled adjacent the first air passageway, the first reed vibrating to produce sounds as air passes over the first reed;
   a second reed coupled adjacent the second air passageway, the second reed vibrating to produce sounds as air passes over the second reed;
   the first and second sounding boards, air passageways, and reeds being oriented immediately adjacent one another to be positioned simultaneously inside the mouth of the user of the game call apparatus further comprising a sound chamber coupled to the first and second air passageways.

3. A game call apparatus according to claim 2 wherein the user's mouth comprises a user's lip.

4. A game call apparatus according to claim 2 wherein the first reed and the second reed are separate from each other.

5. A game call apparatus according to claim 2 wherein the first sounding board and the second sounding board are separate from each other.

6. A game call apparatus according to claim 2 wherein the first air passageway and the second air passageway are oriented relative to each other in a side-by-side relationship.

7. A game call apparatus according to claim 2 wherein the first air passageway and the second air passageway are oriented relative to each other in a side-by-side relationship, and the first and second reed are coupled on top of the first and second air passageways.

8. A game call apparatus according to claim 2 further comprising a wall separating the first air passageway and the second air passageway.

9. A game call apparatus according to claim 2 wherein the user's mouth defines an effective length of the first reed and the second reed.

10. A game call apparatus according to claim 2 wherein the first and second reeds are separate from each other along at least some areas corresponding to the first and second reeds.

11. A game call apparatus, comprising:
    a first sounding board;
    a second sounding board;
    a first air passageway formed in the first sounding board;
    a second air passageway formed in the second sounding board;
    a first reed coupled adjacent the first air passageway, the first reed vibrating to produce sounds as air passes over the first reed;
    a second reed coupled adjacent the second air passageway, the second reed vibrating to produce sounds as air passes over the second reed;
    the first and second sounding boards, air passageways, and reeds being oriented immediately adjacent one another to be positioned simultaneously inside the mouth of the user of the game call apparatus further comprising:
    a sound chamber operatively coupled to at least one of the air passageways;
    a plurality of apertures defined by the sound chamber to adjust the tones created by the game call.

12. A game call apparatus, comprising:
    a first sounding board;
    a second sounding board;
    a first air passageway formed in the first sounding board;
    a second air passageway formed in the second sounding board;
    a first reed coupled adjacent the first air passageway, the first reed vibrating to produce a sound as air passes over the first reed;
    a second reed coupled adjacent the second air passageway, the second reed vibrating to produce a sound as air passes over the second reed;
    a first retainer to hold the first reed in place relative to the first sounding board;

a second retainer to hold the second reed in place relative to the second sounding board;

a housing to secure together the first sounding board, the first reed, and the first retainer, and to secure together the second sounding board, the second reed, and the second retainer;

the first and second air passageways and the first and second reeds being oriented immediately adjacent one another to be positioned simultaneously inside the mouth of the user of the game call apparatus wherein the first and second air passageways are completely separate from one another along areas corresponding to the respective reeds, and further comprising a mixing chamber immediately downstream of the first and second air passageways, the mixing chamber receiving air as it passes from the first and second air chambers to mix the sounds before exiting the call.

13. A game call apparatus, comprising:
a first sounding board;
a second sounding board;
a first air passageway formed in the first sounding board;
a second air passageway formed in the second sounding board;
a first reed coupled adjacent the first air passageway, the first reed vibrating to produce a sound as air passes over the first reed;
a second reed coupled adjacent the second air passageway, the second reed vibrating to produce a sound as air passes over the second reed;
a first retainer to hold the first reed in place relative to the first sounding board;
a second retainer to hold the second reed in place relative to the second sounding board;
a housing to secure together the first sounding board, the first reed, and the first retainer, and to secure together the second sounding board, the second reed, and the second retainer;
the first and second air passageways and the first and second reeds being oriented immediately adjacent one another to be positioned simultaneously inside the mouth of the user of the game call apparatus further comprising a sound chamber coupled to the first and second air passageways.

14. A game call apparatus, comprising:
a first sounding board;
a second sounding board;
a first air passageway formed in the first sounding board;
a second air passageway formed in the second sounding board;
a first reed coupled adjacent the first air passageway, the first reed vibrating to produce a sound as air passes over the first reed;
a second reed coupled adjacent the second air passageway, the second reed vibrating to produce a sound as air passes over the second reed;
a first retainer to hold the first reed in place relative to the first sounding board;
a second retainer to hold the second reed in place relative to the second sounding board;
a housing to secure together the first sounding board, the first reed, and the first retainer, and to secure together the second sounding board, the second reed, and the second retainer;
the first and second air passageways and the first and second reeds being oriented immediately adjacent one another to be positioned simultaneously inside the mouth of the user of the game call apparatus further comprising:
a sound chamber operatively coupled to at least one of the air passageways;
a plurality of apertures defined by the sound chamber to adjust the tones created by the game call.

15. A game call apparatus, comprising:
a reed assembly comprising a first sounding board defining a first air channel and a second sounding board defining a second air channel, the first and second air channels being immediately adjacent one another, the first and second air channels each comprising an inlet and an outlet;
a first reed portion extending over the first air channel;
a second reed portion extending over the second air channel;
the first and second reed portions being insertable simultaneously into a user's mouth for direct contact with the user's mouth to create sounds.

16. A game call apparatus according to claim 15 wherein the user's mouth comprises a user's lip.

17. A game call apparatus according to claim 15 wherein the first reed portion and the second reed portion are separate from each other.

18. A game call apparatus according to claim 15 wherein the first sounding board and the second sounding board are separate from each other.

19. A game call apparatus according to claim 15 wherein the first air channel and the second air channel are oriented relative to each other in a side-by-side relationship.

20. A game call apparatus according to claim 15 wherein the first air channel and the second air channel are oriented relative to each other in a side-by-side relationship, and the first and second reed portions are coupled on top of the first and second air channels.

21. A game call apparatus according to claim 15 further comprising a wall separating the first air channel and the second air channel.

22. A game call apparatus according to claim 15 wherein the user's mouth defines an effective length of the first reed portion and the second reed portion.

23. A game all apparatus according to claim 15 wherein the first and second reed portions are separate from each other along at least some areas corresponding to the first and second reed portions.

24. A game call apparatus, comprising:
a first sounding board,
a second sounding board;
a first air passageway formed in the first sounding board, a second air passageway formed in the second sounding board;
a first reed coupled adjacent the first air passageway, the first reed vibrating to produce sounds as air passes over the first reed;
a second reed coupled adjacent the second air passageway, the second reed vibrating to produce sounds as air passes over the second reed;
the first and second sounding boards, air passageways, and reeds being oriented immediately adjacent one another to be positioned simultaneously inside the mouth of the user of the game call apparatus;
wherein the first and second reeds are coupled adjacent the first and second sounding boards such that no structure is above the first reed or the second reed to enable a user's mouth to directly contact the first and second reeds during use;

wherein the first and second reeds are insertable simultaneously into the user's mouth.

25. A game call apparatus according to claim 24 wherein the first and second air passageways are completely separate from one another.

26. A game call apparatus according to claim 24 wherein the first and second air passageways are completely separate from one another along areas corresponding to the respective reeds.

27. A game call apparatus according to claim 24, further comprising a wall separating the first and second air passageways to separate air passing along the first reed and air passing along the second reed.

28. A game call apparatus according to claim 24 wherein the first passageway and the second passageway are oriented relative to each other in a side-by-side relationship.

29. A game call apparatus according to claim 24 wherein the first passageway and the second passageway are oriented relative to each other in a side-by-side relationship with the first and second reeds being coupled on top of the first and second air passageways, respectively.

30. A game call apparatus according to claim 24, further comprising:
a first sound chamber operatively coupled to the first air passageway;
a second sound chamber operatively coupled to the second air passageway.

31. A game call apparatus, comprising:
a first sounding board;
a second sounding board;
a first air passageway formed in the first sounding board;
a second air passageway formed in the second sounding board;
a first reed coupled adjacent the first air passageway, the first reed vibrating to produce a sound as air passes over the first reed;
a second reed coupled adjacent the second air passageway, the second reed vibrating to produce a sound as air passes over the second reed;
a first retainer to hold the first reed in place relative to the first sounding board;
a second retainer to hold the second reed in place relative to the second sounding board;
a housing to secure together the first sounding board, the first reed, and the first retainer, and to secure together the second sounding board, the second reed, and the second retainer;
the first and second air passageways and the first and second reeds being oriented immediately adjacent one another to be positioned simultaneously inside the mouth of the user of the game call apparatus;
wherein the first and second reeds are coupled adjacent the first and second sounding boards such that no structure is above the first reed or the second read to enable a user's mouth to directly contact the first and second reeds during use.

32. A game call apparatus according to claim 31 wherein the first and second air passageways are completely separate from one another.

33. A game call apparatus according to claim 31 wherein the first and second air passageways are completely separate from one another along areas corresponding to the respective reeds.

34. A game call apparatus according to claim 31 further comprising a wall separating the first and second air passageways to separate air passing along the first reed and air passing along the second reed.

35. A game call apparatus according to claim 31 wherein the first passageway and the second passageway are oriented relative to each other in a side-by-side relationship.

36. A game call apparatus according to claim 31 wherein the first passageway and the second passageway are oriented relative to each other in a side-by-side relationship with the first and second reeds being coupled on top of the first and second air passageways, respectively.

37. A game call apparatus according to claim 31 further comprising:
a first sound chamber operatively coupled to the first air passageway;
a second sound chamber operatively coupled to the second air passageway.

38. A game call apparatus, comprising:
a reed assembly comprising an inlet and an outlet;
a first reed coupled to the reed assembly;
a second reed coupled to the reed assembly;
the first and second reeds being positioned immediately adjacent one another to provide separate sources of sounds;
the first and second reeds having respective effective lengths, the effective lengths vibrating and creating sounds when air passes across the effective lengths, the reeds being free of structures above the respective effective lengths for direct contact by a user's mouth, the effective lengths being insertable simultaneously into the user's mouth.

39. A game call apparatus, comprising:
a reed assembly comprising an inlet and an outlet;
a first reed coupled to the reed assembly;
a second reed coupled to the reed assembly;
the first and second reeds being positioned immediately adjacent one another to provide separate sources of sounds, the first and second reeds each having an effective length;
the first and second reeds being free of any structure above their respective effective lengths for directly contacting a user's mouth, the first and second reeds being insertable simultaneously into the user's mouth.

40. A game call apparatus, comprising:
a reed assembly comprising an inlet and an outlet;
a first reed coupled to the reed assembly;
a second reed coupled to the reed assembly;
the first and second reeds being positioned immediately adjacent one another to provide separate sources of sounds, the first and second reeds having a cantilevered distance that defines an effective length for the respective reeds, the effective lengths of the reeds being insertable simultaneously into a user's mouth;
wherein the effective lengths of the first and second reeds being absent of any structure that would prevent direct contact of the effective lengths of the reeds by the user's mouth.

41. A game call apparatus, comprising:
a reed assembly comprising an inlet and an outlet;
a first reed coupled to the reed assembly;
a second reed coupled to the reed assembly;
the first and second reeds being positioned immediately adjacent one another to provide separate sources of sounds, the first and second reeds each having an effective length;
the first and second reeds being free of any structure above the respective effective lengths;

the first and second reeds being arranged and configured for simultaneous insertion into a user's mouth and direct engagement by a user's lip to vary the effective lengths of the reeds and thus the tones produced by the first and second reeds.

42. A game call apparatus, comprising:

a reed assembly comprising an inlet and an outlet;

a pair of reeds each having an effective length;

the reeds being coupled to the reed assembly immediately adjacent each other;

the reeds being free of any structure above their effective lengths such that the reeds can be simultaneously inserted into and directly engaged by a user's mouth to vary the effective lengths of the reeds while causing the reeds to create sounds.

43. A game call apparatus, comprising:

a dual reed game call comprising a housing and a pair of reed effective lengths, the effective lengths each capable of producing sounds independent of one another;

the effective lengths being free of structures above the effective lengths so that the effective lengths can be directly contacted by a user's mouth during operation, the effective lengths being simultaneously insertable into the user's mouth.

44. A game call apparatus, comprising:

a reed assembly comprising a first air channel and a second air channel, the first and second air channels being immediately adjacent one another, the first and second air channels each comprising an inlet and an outlet;

at least a portion of a first reed extending over the first air channel to provide a first reed effective length;

at least a portion of a second reed extending over the second air channel to provide a second reed effective length;

the portions of the first and second reeds being free of any structure above their effective lengths such that the reeds can be directly engaged by a user's mouth to create sounds;

the portions of the first and second reeds being insertable simultaneously into the user's mouth.

\* \* \* \* \*